US012632005B2

(12) United States Patent
Uchiyama et al.

(10) Patent No.: US 12,632,005 B2
(45) Date of Patent: May 19, 2026

(54) IMAGE FORMING APPARATUS AND NON-TRANSITORY COMPUTER READABLE MEDIUM STORING IMAGE FORMING PROGRAM CAPABLE OF EXCHANGING PIECES OF MANAGEMENT INFORMATION OF TWO EXCHANGED CONSUMABLE UNITS

(71) Applicant: FUJIFILM Business Innovation Corp., Tokyo (JP)

(72) Inventors: Kazunobu Uchiyama, Kanagawa (JP); Takumi Nishikata, Kanagawa (JP); Eiichi Waida, Kanagawa (JP); Hideo Kimura, Kanagawa (JP); Yusuke Chika, Kanagawa (JP); Yuzo Fujita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/190,067

(22) Filed: Mar. 24, 2023

(65) Prior Publication Data

US 2024/0103432 A1 Mar. 28, 2024

(30) Foreign Application Priority Data

Sep. 26, 2022 (JP) ................................. 2022-153050

(51) Int. Cl.
*G03G 15/00* (2006.01)
*G03G 21/18* (2006.01)

(52) U.S. Cl.
CPC ....... *G03G 21/1882* (2013.01); *G03G 15/502* (2013.01); *G03G 15/556* (2013.01)

(58) Field of Classification Search
CPC .. G03G 15/502; G03G 15/553; G03G 15/556; G03G 21/1882
See application file for complete search history.

(56) References Cited

U.S. PATENT DOCUMENTS 7,228,078 B2 6/2007 Okochi
10,599,075 B1 * 3/2020 Tanaka ............... G03G 15/0131
(Continued)

FOREIGN PATENT DOCUMENTS

JP 2006071905 3/2006

*Primary Examiner* — Hoang X Ngo
(74) *Attorney, Agent, or Firm* — JCIPRNET

(57) ABSTRACT

An image forming apparatus includes plural image forming units including plural image forming sections and an intermediate transfer body to which a toner image formed on the plural image forming sections is primarily transferred, and a processor, in which wherein the processor is configured to, in a case where, during image formation using any of the image forming units among the image forming units, in a case where a consumable of any of the image forming sections of the image forming unit is insufficient, an image forming section of an identical color to the image forming section of which the consumable is insufficient is present in another image forming unit, and a storage medium for storing management information for managing a consumable unit is not provided in the consumable unit attached to the image forming section of which the consumable is insufficient, ask a user whether or not to exchange the consumable unit attached to the image forming section of which the consumable is insufficient and a consumable unit set in the image forming section of the other image forming unit, and, in a case where information indicating a selection to exchange the consumable units has been received from the user, exchange pieces of management information of the two exchanged consumable units.

8 Claims, 12 Drawing Sheets

(56) References Cited

U.S. PATENT DOCUMENTS

| | | | | |
|---|---|---|---|---|
| 2008/0124096 | A1 * | 5/2008 | Wada ................. | G03G 15/5079 399/24 |
| 2020/0310304 | A1 * | 10/2020 | Hagiwara .......... | G03G 15/5058 |

* cited by examiner

FIG. 6

BEFORE EXCHANGE

TONER REMAINING AMOUNT

| DATE AND TIME | FIRST IMAGE FORMING UNIT | | | | SECOND IMAGE FORMING UNIT | | | |
|---|---|---|---|---|---|---|---|---|
| | C | M | Y | K | WHITE | GOLD | SILVER | K |
| 10/15/XX 12:00 | 91 | 82 | 87 | 3 | 94 | 94 | 94 | 93 |
| 10/16/XX 12:00 | 92 | 84 | 89 | 7 | 95 | 95 | 95 | 93 |
| 10/17/XX 12:00 | 93 | 85 | 90 | 10 | 96 | 96 | 96 | 93 |
| 10/3/XX 12:00 | 98 | 97 | 96 | 90 | 99 | 99 | 99 | 96 |
| 10/2/XX 12:00 | 99 | 98 | 99 | 95 | 100 | 100 | 100 | 98 |
| 10/1/XX 12:00 | 100 | 100 | 100 | 100 | 100 | 100 | 100 | 100 |

AFTER EXCHANGE

TONER REMAINING AMOUNT

| DATE AND TIME | FIRST IMAGE FORMING UNIT | | | | SECOND IMAGE FORMING UNIT | | | |
|---|---|---|---|---|---|---|---|---|
| | C | M | Y | K | WHITE | GOLD | SILVER | K |
| 10/15/XX 12:00 | 91 | 82 | 87 | 93 | 94 | 94 | 94 | 3 |
| 10/16/XX 12:00 | 92 | 84 | 89 | 93 | 95 | 95 | 95 | 7 |
| 10/17/XX 12:00 | 93 | 85 | 90 | 93 | 96 | 96 | 96 | 10 |
| 10/3/XX 12:00 | 98 | 97 | 96 | 96 | 99 | 99 | 99 | 90 |
| 10/2/XX 12:00 | 99 | 98 | 99 | 98 | 100 | 100 | 100 | 95 |
| 10/1/XX 12:00 | 100 | 100 | 100 | 100 | 100 | 100 | 100 | 100 |

FIG. 12

TONER REMAINING AMOUNT

| DATE AND TIME | FIRST IMAGE FORMING UNIT | | | | SECOND IMAGE FORMING UNIT | | | |
|---|---|---|---|---|---|---|---|---|
| | C | M | Y | K | WHITE | GOLD | SILVER | K |
| 10/15/XX 12:00 | 91 | 82 | 87 | 3 | 94 | 94 | 94 | 93 |
| 10/16/XX 12:00 | 92 | 84 | 89 | 7 | 95 | 95 | 95 | 93 |
| 10/17/XX 12:00 | 93 | 85 | 90 | 10 | 96 | 96 | 96 | 93 |
| 10/3/XX 12:00 | 98 | 97 | 96 | 90 | 99 | 99 | 99 | 96 |
| 10/2/XX 12:00 | 99 | 98 | 99 | 95 | 100 | 100 | 100 | 98 |
| 10/1/XX 12:00 | 100 | 100 | 100 | 100 | 100 | 100 | 100 | 100 |

EXCHANGE TONER CARTRIDGES

TONER REMAINING AMOUNT FOR EACH PRINTING INSTRUCTION

No.006 UNIT 1 C1 M1 Y1 K3

No.007 UNIT 2 WHITE 1 GOLD 1 SILVER 1 K0

No.008 UNIT 2 WHITE 1 GOLD 1 SILVER 1 K0

No.009 UNIT 1 C1 M2 Y2 K4

TONER REMAINING AMOUNT

| DATE AND TIME | FIRST IMAGE FORMING UNIT | | | | SECOND IMAGE FORMING UNIT | | | |
|---|---|---|---|---|---|---|---|---|
| | C | M | Y | K | WHITE | GOLD | SILVER | K |
| 10/15/XX 12:00 | 91 | 82 | 87 | 86 | 94 | 94 | 94 | 10 |
| 10/16/XX 12:00 | 92 | 84 | 89 | 90 | 95 | 95 | 95 | 10 |
| 10/17/XX 12:00 | 93 | 85 | 90 | 93 | 96 | 96 | 96 | 10 |
| 10/3/XX 12:00 | 98 | 97 | 96 | 96 | 99 | 99 | 99 | 90 |
| 10/2/XX 12:00 | 99 | 98 | 99 | 98 | 100 | 100 | 100 | 95 |
| 10/1/XX 12:00 | 100 | 100 | 100 | 100 | 100 | 100 | 100 | 100 |

EXCHANGE TONER CARTRIDGES

IMAGE FORMING APPARATUS AND NON-TRANSITORY COMPUTER READABLE MEDIUM STORING IMAGE FORMING PROGRAM CAPABLE OF EXCHANGING PIECES OF MANAGEMENT INFORMATION OF TWO EXCHANGED CONSUMABLE UNITS

CROSS-REFERENCE TO RELATED APPLICATIONS

This application is based on and claims priority under 35 USC 119 from Japanese Patent Application No. 2022-153050 filed Sep. 26, 2022.

BACKGROUND

(i) Technical Field

The present invention relates to an image forming apparatus and a non-transitory computer readable medium storing an image forming program.

(ii) Related Art

JP2006-071905A discloses a printing control device in which, in a case where a consumable is removed, a consumable state stored in a storage unit is acquired, and a warning message is displayed in a case where the consumable can be continuously used such that a usable consumable can be used without waste.

SUMMARY

In an image forming apparatus provided with a plurality of image forming units having intermediate transfer bodies to which a toner image formed by a plurality of image forming sections is primarily transferred, a toner image of each intermediate transfer body of the plurality of image forming units is secondarily transferred to a recording medium such as printing paper such that an image is formed. In such an image forming apparatus, at least one image forming section of an identical color may be provided in common among the image forming units. In such a case, in a case where a consumable such as toner is exhausted in any of image forming sections provided in a certain image forming unit and printing is stopped, printing can be continued by replacing a consumable unit such as a toner cartridge set in an image forming section of another image forming unit with a consumable unit set in the image forming section in which the consumable has been exhausted.

However, in a case where a storage medium for storing management information of consumables, called a customer replaceable unit memory (CRUM), is not attached to the consumable unit, he image forming apparatus side cannot detect that the consumable unit has been replaced. As a result, management information such as a remaining amount of each consumable unit managed on the image forming apparatus side and a state such as a remaining amount of the consumable unit set in each of the plurality of image forming sections do not correspond to each other, and thus a problem may occur in a printing process.

Aspects of non-limiting embodiments of the present disclosure relate to an image forming apparatus and a non-transitory computer readable medium storing an image forming program for enabling management information of each consumable unit managed on an image forming apparatus side and a state of a consumable unit set in each of a plurality of image forming sections to correspond to each other when the consumable unit is replaced even in a case where a storage medium for storing management information of a consumable is not attached to the consumable unit set in each of the plurality of image forming sections in the image forming apparatus provided with a plurality of image forming units having the plurality of image forming sections.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a plurality of image forming units including a plurality of image forming sections and an intermediate transfer body to which a toner image formed on the plurality of image forming sections is primarily transferred, and a processor, in which the processor is configured to, in a case where, during image formation using any of the image forming units among the image forming units, in a case where a consumable of any of the image forming sections of the image forming unit is insufficient, an image forming section of an identical color to the image forming section of which the consumable is insufficient is present in another image forming unit, and a storage medium for storing management information for managing a consumable unit is not provided in the consumable unit attached to the image forming section of which the consumable is insufficient, ask a user whether or not to exchange the consumable unit attached to the image forming section of which the consumable is insufficient and a consumable unit set in the image forming section of the other image forming unit, and, in a case where information indicating a selection to exchange the consumable units has been received from the user, exchange pieces of management information of the two exchanged consumable units.

BRIEF DESCRIPTION OF THE DRAWINGS

Exemplary embodiment(s) of the present invention will be described in detail based on the following figures, wherein:

FIG. 6 is a diagram showing an example of a state of remaining amount information of toner recorded in a consumable remaining amount recording portion before and after exchange of the toner cartridges;

FIG. 12 is a diagram showing an example of a state of the remaining amount information of toner recorded in the consumable remaining amount recording portion before and after exchange of the toner cartridges.

DETAILED DESCRIPTION

An image forming apparatus according to an exemplary embodiment of the present invention will be described with reference to the drawings. First, an overall configuration and a hardware configuration of an image forming apparatus 10 will be described with reference to FIGS. 1 and 2.

Figure 1:
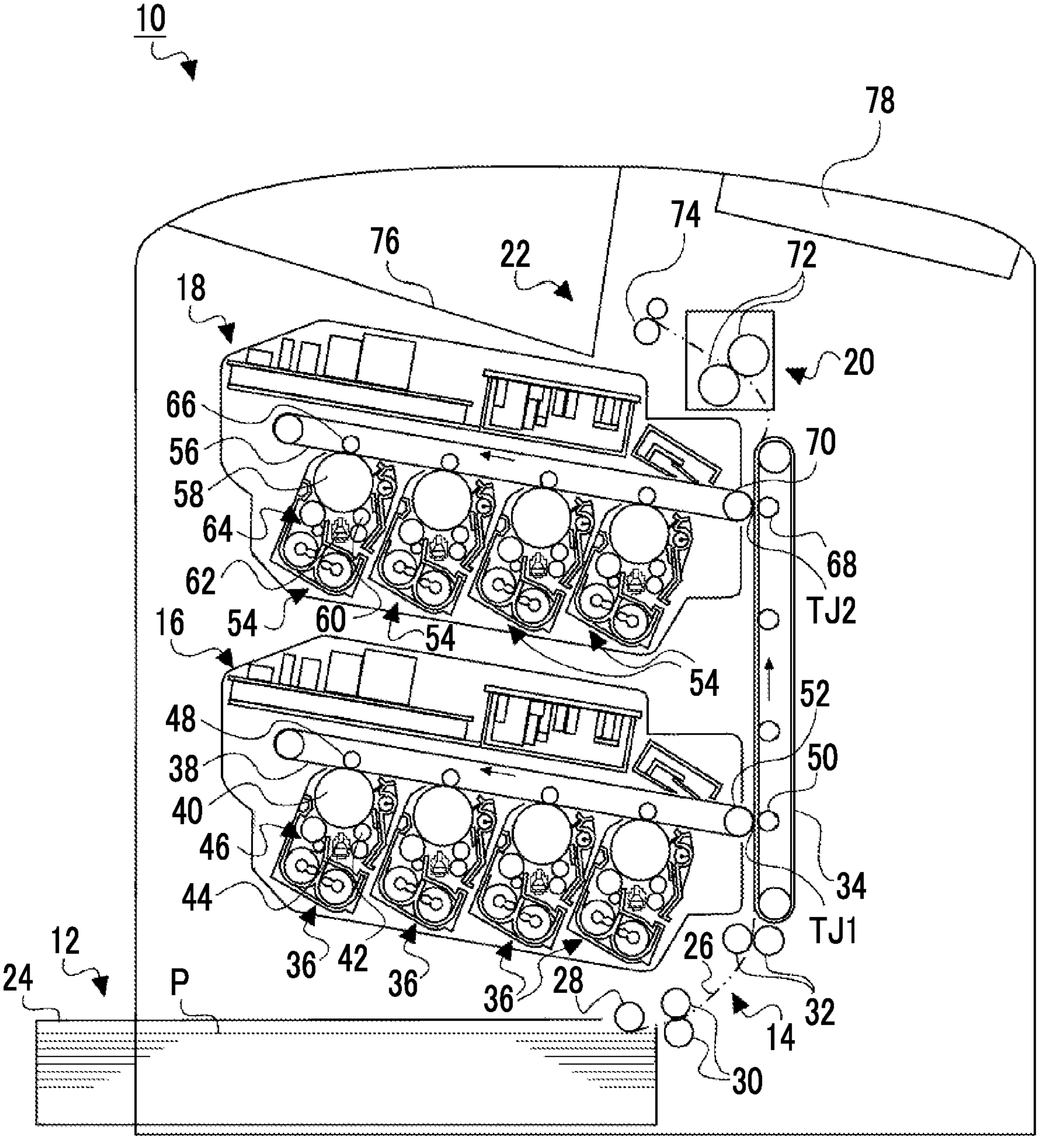
FIG. 1 is a diagram showing an overall configuration of an image forming apparatus according to an exemplary embodiment.

As shown in FIG. 1, the image forming apparatus 10 includes a paper feeding device 12, a transport device 14, a first image forming unit 16, a second image forming unit 18, a fixing device 20, and a discharge device 22.

The paper feeding device 12 includes an accommodation section 24 in which recording paper P as an example of a recording medium is accommodated, and a transmission roll 28 transmitting the recording paper P accommodated in the accommodation section 24 to be transported along a transport path 26.

The transport device 14 includes a transport roll 30, a resist roll pair 32, and a transport belt 34 in this order from the upstream side in the transport direction.

The first image forming unit 16 includes four image forming sections 36 and an endless first intermediate transfer belt 38 as an example of an intermediate transfer body. A toner image formed by the four image forming sections 36 is transferred to the first intermediate transfer belt 38, and the first intermediate transfer belt 38 is rotatably attached counterclockwise with a front view of FIG. 2. Each of the image forming sections 36 includes a photoconductor 40, a charging member 42 that charges a surface of the photoconductor 40, an exposure device 44 that irradiates the charged photoconductor 40 with exposure light, and a developing device 46 that develop s an electrostatic latent image formed due to the irradiation with the exposure light to be visualized as a toner image. The toner image is an image using toner as an example of a coloring material such as a developer.

A primary transfer roll 48 is disposed at a position facing each photoconductor 40 with the first intermediate transfer belt 38 interposed therebetween, and primarily transfers a toner image formed by each developing device 46 of the image forming section 36 onto the first intermediate transfer belt 38.

A secondary transfer roll 50 is disposed in a location where the first intermediate transfer belt 38 and the transport belt 34 are close to each other to sandwich the first intermediate transfer belt 38 and the transport belt 34 between the secondary transfer roll 50 and a backup roll 52. The secondary transfer roll 50 transfers the toner image formed on the first intermediate transfer belt 38 onto the recording paper P transported between the first intermediate transfer belt 38 and the transport belt 34 at a secondary transfer position TJ1 on the upstream side.

Similar to the first image forming unit 16, the second image forming unit 18 includes four image forming sections 54 and an endless second intermediate transfer belt 56. The second intermediate transfer belt 56 is rotatably attached such that a toner image formed by the four image forming sections 54 is transferred thereto. Each of the image forming sections 54 includes a photoconductor 58, a charging member 60 that charges a surface of the photoconductor 58, an exposure device 62 that irradiates the charged photoconductor 58 with exposure light, and a developing device 64 that develops an electrostatic latent image formed due to irradiation with the exposure light to be visualized as a toner image.

The primary transfer roll 66 is disposed at a position facing each photoreceptor 58 with the second intermediate transfer belt 56 interposed therebetween, and the toner image formed by the image forming section 54 is transferred onto the second intermediate transfer belt 56.

A secondary transfer roll 68 is disposed in a location where the second intermediate transfer belt 56 and the transport belt 34 are close to each other to sandwich the second intermediate transfer belt 56 and the transport belt 34 between the secondary transfer roll 68 and a backup roll 70. The secondary transfer roll 68 transfers the toner image formed on the second intermediate transfer belt 56 onto the recording paper P which is transported between the second intermediate transfer belt 56 and the transport belt 34 at a secondary transfer position TJ2 on the downstream side.

The fixing device 20 has a fixing roll pair 72, and heats and presses the toner image transferred to the recording paper P to be fixed.

The discharge device 22 has a discharge roll 74 and a discharge tray 76, and the discharge roll 74 discharges the recording paper P output from the fixing device 20 to the discharge tray 76.

The first image forming unit 16 and the second image forming unit 18 are disposed to be arranged in the vertical direction. In the present exemplary embodiment, the second image forming unit 18 is disposed above the first image forming unit 16. From another point of view, the second image forming unit 18 is disposed on the downstream side in the transport direction of the first image forming unit 16.

The image forming apparatus 10 of the present exemplary embodiment is a so-called single-pass system, and printing is performed by passing the recording paper P in front of each of the first image forming unit 16 and the second image forming unit 18 only once.

The image forming apparatus 10 of the present exemplary embodiment includes an operation panel 78. The operation panel 78 is a display on which a touch panel is superimposed, but is not limited thereto. An icon image or the like is displayed on the operation panel 78 as an example of an image representing an item that is an operation target in order to execute a function desired by a user. There is no limitation on the type of icon image as long as the icon image is an operation target of the user, and the icon image includes, for example, a button, a scroll bar, a check box, and a radio button. In a case where a user operation is performed on the icon image, a process associated with operation details in advance is executed by a controller section 92 (refer to FIG. 3) that will be described later, and a response to the operation is displayed on the operation panel 78.

Figure 2:
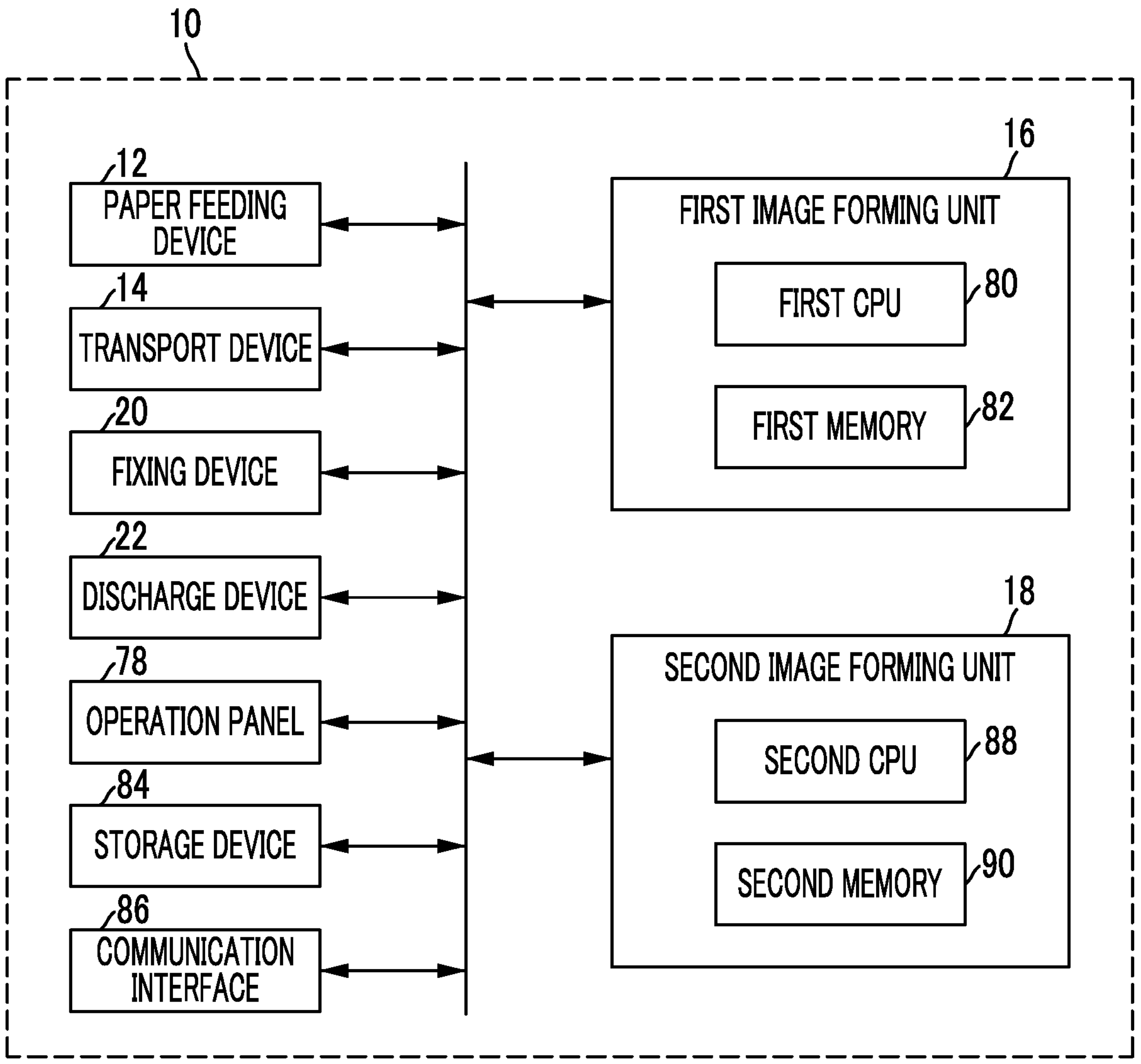
FIG. 2 is a block diagram showing an example of a hardware configuration of the image forming apparatus of the exemplary embodiment.

The first image forming unit 16 includes a control board (not shown), and a first CPU 80 and a first memory 82 are disposed on the control board as shown in FIG. 2.

The first CPU 80 is a control microprocessor, and controls an operation of each of the first image forming unit 16, the paper feeding device 12, the transport device 14, the fixing device 20, the discharge device 22, and the operation panel 78 on the basis of a control program stored in a storage device 84 that will be described later. The first memory 82 temporarily stores print data received via a communication interface 86 that will be described later.

Similarly, the second image forming unit 18 includes a control board (not shown), and a second CPU 88 and a second memory 90 are disposed on the control board.

The second CPU 88 is a control microprocessor and controls an operation of each part of the second image forming unit 18 on the basis of a control program stored in the storage device 84. The second memory 90 temporarily stores print data received from the first image forming unit 16.

The image forming apparatus 10 further includes the storage device 84 and the communication interface 86. The storage device 84 is configured by a hard disk drive (abbreviated to an HDD) or a solid state drive (abbreviated to an SSD), and stores a control program for controlling an operation of each part of the image forming apparatus 10. The communication interface 86 receives print data from a computer directly connected by wire or wirelessly or connected via a network, or transmits and receives information required for printing.

Figure 3:
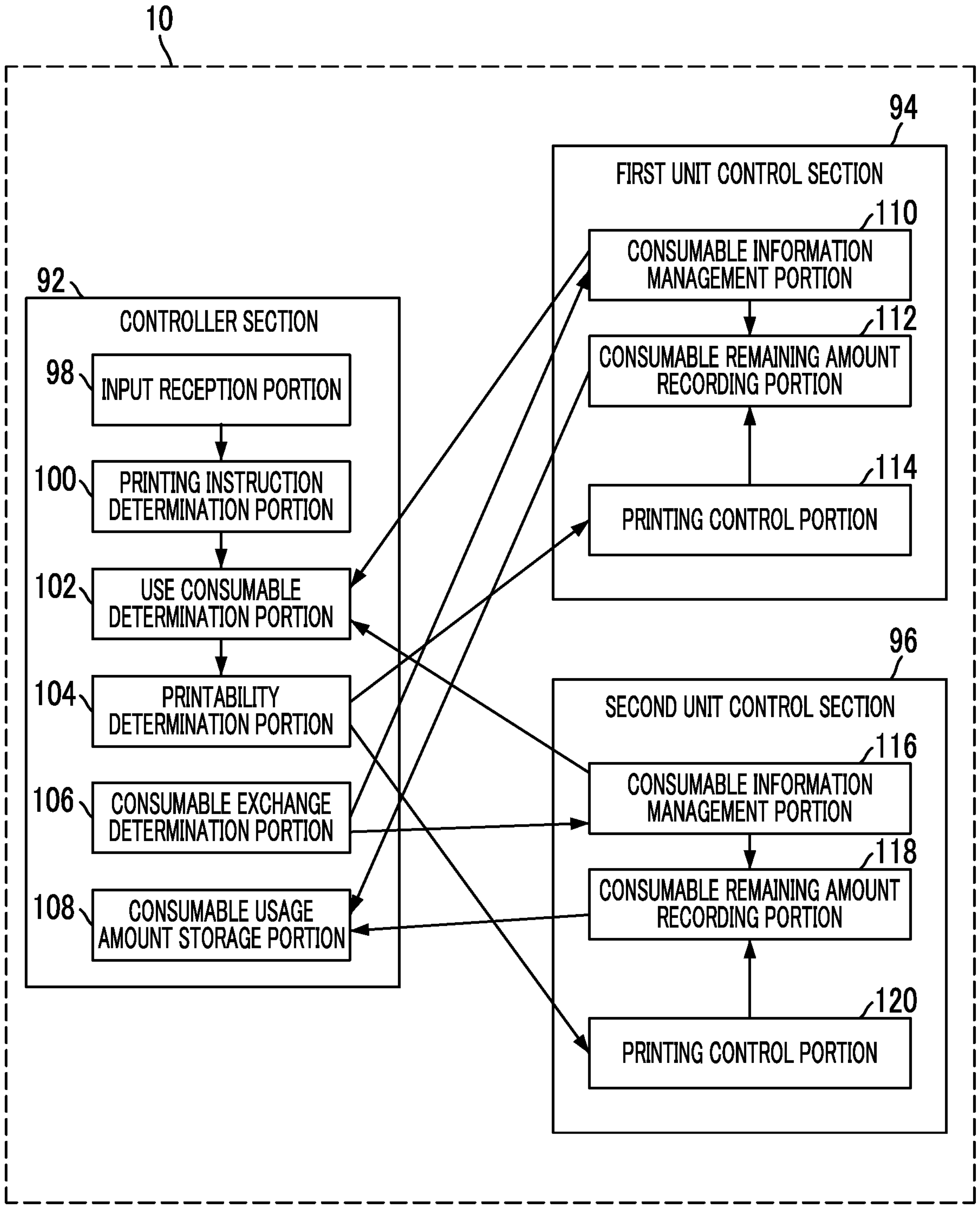
FIG. 3 is a block diagram showing a functional configuration of the image forming apparatus of the exemplary embodiment.

Next, a functional configuration of the image forming apparatus 10 of the present exemplary embodiment will be described with reference to FIG. 3. The image forming apparatus 10 executes the control program stored in the storage device 84 in the first CPU 80 and the second CPU 88. As a result, the controller section 92 functions as a first unit control section 94 for the first image forming unit 16, and a second unit control section 96 for the second image forming unit 18. The first unit control section 94 functions as a control section that not only controls the first image forming unit 16, but also controls an operation of each part of the paper feeding device 12, the transport device 14, the fixing device 20, the discharge device 22, and the operation panel 78.

The controller section 92 includes an input reception portion 98, a printing instruction determination portion 100, a use consumable determination portion 102, a printability determination portion 104, a consumable exchange determination portion 106, and a consumable usage amount storage portion 108.

The input reception portion 98 receives a printing instruction transmitted from application software of a computer connected via the communication interface 86, and temporarily stores the printing instruction in the first memory 82. The printing instruction is a printing instruction including one or a plurality of pieces of print data and a series of processing commands, and the print data includes at least one of text data or image data. The input reception portion 98 converts the printing instruction stored in the first memory 82 into printable image data such as a raster image on the basis of the print data and the processing commands included in the printing instruction, and stores the image data in the first memory 82.

In a case where the input reception portion 98 receives the printing instruction, the printing instruction determination portion 100 determines whether the printing instruction is an instruction for using both the first image forming unit 16 and the second image forming unit 18 or an instruction for using one of the first image forming unit 16 or the second image forming unit 18.

The use consumable determination portion 102 determines a color of toner required for executing the printing instruction received by the input reception portion 98, and determines which image forming unit is to be used to execute the printing instruction in a case where the printing instruction is an instruction for using only one image forming unit. In the following description, a case where toner is used as a consumable and a toner cartridge is used as a consumable unit will be described as an example.

For example, in order to execute a certain printing instruction, it is determined that four colors such as cyan (C), magenta (M), yellow (Y), and black (K) are required, and in a case where toner cartridges of four colors of CMYK are set in the first image forming unit 16, the first image forming unit 16 is used. In order to execute another printing instruction, it is determined that four colors such as white, gold, silver, and black (K) are required, and in a case where toner cartridges of four colors of white, gold, silver, and K are set in the second image forming unit 18, it is determined that the second image forming unit 18 will be used.

The printability determination portion 104 determines whether or not a toner cartridge specified as being required for printing in the use consumable determination portion 102 is usable. For example, in a case where the use consumable determination portion 102 determines that the four colors of CMYK are required for executing a printing instruction and the first image forming unit 16 will be used, it is determined whether or not each of the toner cartridges of the four colors of CMYK of the first image forming unit 16 is usable.

The printability determination portion 104 transmits an instruction for performing image formation to the image forming unit determined as being used for image formation in a case where the toner cartridge of the color required for printing is usable.

Specifically, in a case where both the first image forming unit 16 and the second image forming unit 18 are used, the printing instruction determination portion 100 gives an instruction for image formation by transmitting the raster image stored in the first memory 82 to both the first unit control section 94 and the second unit control section 96.

On the other hand, in a case where it is determined that image formation is performed by using only the first image forming unit 16, the printability determination portion 104 gives an instruction for image formation by transmitting the raster image stored in the first memory 82 to the first unit control section 94. In a case where it is determined that image formation is performed by using the second image forming unit 18, the printability determination portion 104 gives an instruction for image formation by transmitting the raster image stored in the first memory 82 to the second unit control section 96.

In the following description, a case where toner cartridges of four colors of CMYK are set in the first image forming unit 16 and toner cartridges of four colors of white, gold, silver, and black (K) are set in the second image forming unit 18 will be described. That is, it is assumed that toner cartridges of an identical color of black (K) are set in the first image forming unit 16 and the second image forming unit 18.

In a case where printing cannot be performed because there is no remaining amount of a certain color among the four colors of toner of CMYK of the first image forming unit 16, the printability determination portion 104 determines whether or not a toner cartridge of an identical color to the toner having no remaining amount is present in the second image forming unit 18. For example, in a case where there is no remaining amount of black (K) toner that is insufficient in the first image forming unit 16, it is determined whether or not a black (K) toner cartridge is set in the second image forming unit 18, and whether or not there is a remaining amount. In a case where there is a remaining amount of the black (K) toner of the second image forming unit 18, the printability determination portion 104 determines that printing can be performed by exchanging the two toner cartridges.

In the following description, "exchange" of "toner cartridges" means that toner cartridges of an identical color set in the first image forming unit 16 and the second image forming unit 18 are exchanged with each other. "Exchange" means to replace a toner cartridge with a new toner cartridge that is equipped with a storage medium for storing management information of the toner cartridge, which is called a CRUM.

The consumable exchange determination portion 106 detects and manages exchange of toner cartridges. By detecting the CRUM, the consumable exchange determination portion 106 detects that a toner cartridge has been replaced with a new toner cartridge and color information of the currently set toner cartridge.

The consumable usage amount storage portion 108 stores a usage amount of toner consumed when each printing instruction is executed, for each image forming unit and for each color of the toner cartridge. The usage amount of toner for each printing instruction is calculated from a raster image for each color.

The first unit control section 94 includes a consumable information management portion 110, a consumable remaining amount recording portion 112, and a printing control portion 114.

The consumable information management portion 110 manages information regarding a toner cartridge and toner. Specifically, the consumable information management portion 110 stores information regarding a color of toner, such as color particles of the toner used in the four image forming sections 36 of the first image forming unit 16. For example, the consumable information management portion 110 stores information indicating that colors of the toner used in the first image forming unit 16 are four colors of cyan (C), magenta (M), yellow (Y), and black (K). The colors of the toner used in the first image forming unit 16 may be a combination of other colors.

The consumable information management portion 110 notifies the controller section 92 whether or not exchange of toner cartridges is required on the basis of the information regarding the colors of the toner cartridges set in the first image forming unit 16 and information regarding a remaining amount of toner managed by the consumable remaining amount recording portion 112 that will be described later.

The consumable remaining amount recording portion 112 records and stores remaining amount information for each date and time of the toner in the toner cartridge of each color set in the first image forming unit 16. The consumable remaining amount recording portion 112 may record and store a usage amount for each date and time of the toner in the toner cartridge of each color set in the first image forming unit 16.

The printing control portion 114 controls operations of the photoconductor 40, the charging member 42, the exposure device 44, the developing device 46, and the first intermediate transfer belt 38 of the first image forming unit 16 and performs image formation using the first image forming unit 16 in response to an instruction from the printability determination portion 104. At the time of at least one of image formation in the first image forming unit 16 or image formation in the second image forming unit 18, the printing control portion 114 also controls an operation of each part of the paper feeding device 12, the transport device 14, the fixing device 20, and the discharge device 22.

The second unit control section 96 includes a consumable information management portion 116, a consumable remaining amount recording portion 118, and a printing control portion 120.

The consumable information management portion 116 manages information regarding a toner cartridge and toner. Specifically, the consumable information management portion 116 stores information regarding a color of toner, such as color particles of toner used in the four image forming sections 54 of the second image forming unit 18. For example, the consumable information management portion 116 stores information indicating that colors of the toner used in the second image forming unit 18 are four colors of white, gold, silver, and black (K). Colors of the toner used in the second image forming unit 18 may be four colors of CMYK, which are identical to colors of the first image forming unit 16, or may be a combination of other colors.

The consumable information management portion 116 notifies the controller section 92 whether or not exchange of toner cartridges is required on the basis of the information regarding the colors of the toner cartridges set in the second image forming unit 18 and information regarding a remaining amount of toner managed by the consumable remaining amount recording portion 118 that will be described later.

The consumable remaining amount recording portion 118 records and stores remaining amount information for each date and time of the toner in the toner cartridge of each color set in the second image forming unit 18. The consumable remaining amount recording portion 118 may record and store a usage amount for each date and time of the toner in the toner cartridge of each color set in the second image forming unit 18.

The printing control portion 120 controls operations of the photoconductor 58, the charging member 60, the exposure device 62, the developing device 64, and the second intermediate transfer belt 56 of the second image forming unit 18 and performs image formation using the second image forming unit 18 in response to an instruction from the printability determination portion 104.

Next, with reference to FIGS. 4 to 6, a process in a case where the toner cartridges are exchanged during execution of printing in the image forming apparatus 10 of the present exemplary embodiment will be described.

Figure 4:
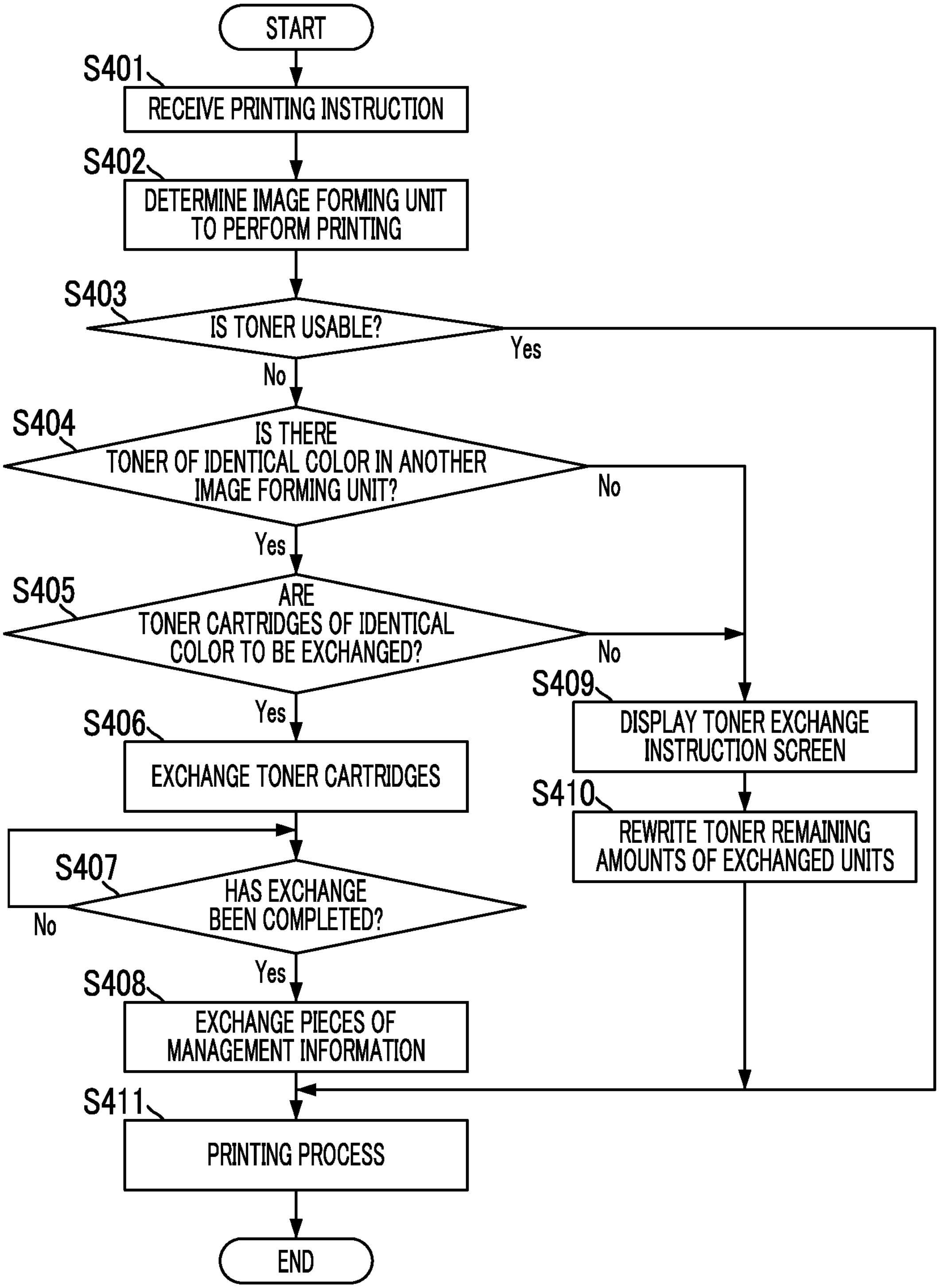
FIG. 4 is a flowchart showing a process in a case where toner cartridges are exchanged at the time of printing.

In step S401 in FIG. 4, the input reception portion 98 of the controller section 92 receives a printing instruction transmitted from the application software of the computer connected via the communication interface 86. Upon receiving the printing instruction, the printing instruction determination portion 100 determines whether the received printing instruction is an instruction for using both the first image forming unit 16 and the second image forming unit 18, or an instruction for using one of the first image forming unit 16 or the second image forming unit 18. In the present exemplary embodiment, a case where the received printing instruction is an instruction for using only one image forming unit will be described. Therefore, a description of a case where the printing instruction is an instruction for using both the first image forming unit 16 and the second image forming unit 18 will be omitted.

In step S402, the use consumable determination portion 102 determines a color of toner required for executing the received printing instruction, and determines which image forming unit is to be used to execute the printing instruction.

In step S403, the printability determination portion 104 determines whether or not a toner cartridge specified to be required for printing in the use consumable determination portion 102 is usable. This determination is performed by the printability determination portion 104 on the basis of a notification from the consumable information management portion 110 of whether or not there is a remaining amount of toner or whether or not a toner cartridge is required to be replaced. Therefore, the term "usable" means a state in which the toner is not in a shortage state. For example, in a case where a remaining amount of toner is more than a preset remaining amount value, it is determined that the toner is not in a shortage state. Alternatively, in a case where a negative value is obtained in a case where a usage amount of toner estimated to be required for executing the printing instruction is subtracted from the remaining amount of toner, it is determined that the toner is in a shortage state.

In a case where it is determined that all the toner cartridges are usable, the process proceeds to the printing process in step S411. The printing process in step S411 will be described later.

In step S403, in a case where it is determined that there is a toner cartridge that is not usable, the process proceeds to step S404. In the following description, it is assumed that a toner cartridge determined as being unusable is not provided with the CRUM which is a storage medium for storing management information for managing a consumable unit. Alternatively, it may be determined whether or not a toner cartridge determined as being unusable is provided with the CRUM, and the following step may be executed only in a case where the CRUM is not provided.

In step S404, the printability determination portion 104 determines whether or not a toner cartridge of an identical color to the unusable toner cartridge is set in the image forming unit that does not perform image formation. For example, in a case where image formation is performed by using the first image forming unit 16, and the black (K) toner cartridge is not usable in the first image forming unit 16, it is determined whether the black (K) toner cartridge is set in the second image forming unit 18.

Figure 5A:
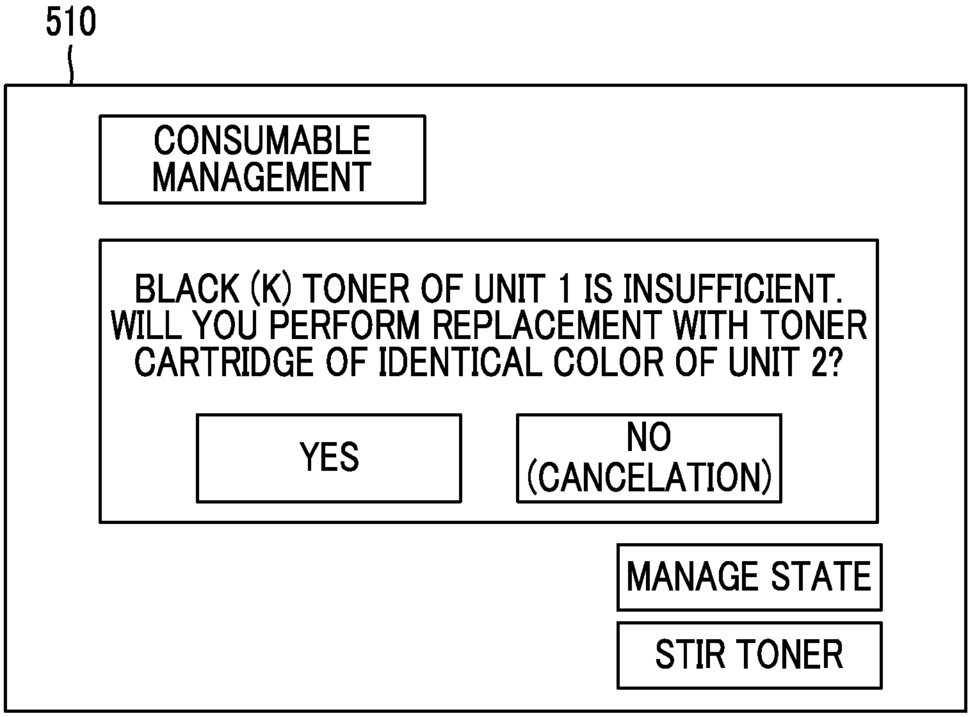
FIG. 5A is a diagram showing an example of an inquiry screen for asking whether to exchange toner cartridges of an identical color.

In a case where it is determined that a consumable of an identical color, for example, a K consumable is not set in the second image forming unit 18, the process proceeds to step S409. In a case where it is determined that a toner cartridge of an identical color, for example, the black (K) toner cartridge is set in the second image forming unit 18, the process proceeds to step S405. In step S405, the consumable exchange determination portion 106 displays an inquiry screen 510 for asking a user whether or not to exchange the toner cartridges of an identical color between the image forming units on the operation panel 78 as shown in FIG. 5A.

Figure 5B:
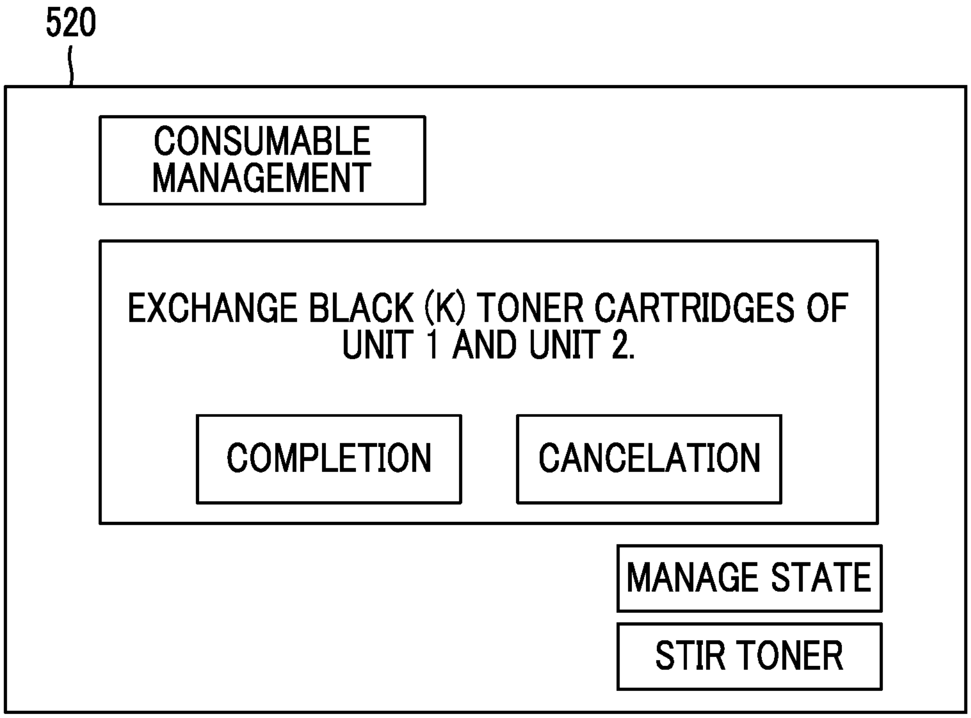
FIG. 5B is a diagram showing a notification screen for prompting to exchange the toner cartridges of an identical color.

In a case where the user operates the operation panel 78 and selects not to exchange the toner cartridges of an identical color on the inquiry screen 510, for example, in a case where the user selects "No (cancel)" button, the process proceeds to step S409. On the other hand, in a case where the user selects to exchange the toner cartridges of an identical color on the inquiry screen 510, for example, in a case where the user selects a "Yes" button, the process proceeds to step S406. In step S406, the consumable exchange determination portion 106 displays a notification screen 520 for prompting exchange of toner cartridges of an identical color as shown in FIG. 5B.

After checking the notification screen 520, the user exchanges the toner cartridge of the color related to exchange of the first image forming unit 16 and the toner cartridge of the corresponding color of the second image forming unit 18. For example, the black (K) toner cartridge of the first image forming unit 16 and the black (K) toner cartridge of the second image forming unit 18 are exchanged.

In a case where the exchange is ended, the user selects a "completion" button on the notification screen 520. In step S407, the consumable exchange determination portion 106 considers that the exchange of the toner cartridges of the color related to exchange has been completed, and proceeds to the subsequent process in step S408.

In step S408, the consumable exchange determination portion 106 exchanges the management information of the two toner cartridges that have been exchanged. That is, the consumable exchange determination portion 106 exchanges the management information of the toner cartridge of the color related to exchange of the first image forming unit 16 and the management information of the toner cartridge of the color related to exchange of the second image forming unit 18.

Specifically, the consumable information management portion 116 of the first unit control section 94 and the consumable information management portion 116 of the second unit control section 96 are instructed to exchange toner remaining amount information of the first image forming unit 16 of the color related to exchange and toner remaining amount information of the second image forming unit 18. In response to this instruction, the consumable remaining amount recording portion 112 of the first unit control section 94 rewrites the toner remaining amount information of the color related to exchange with the toner remaining amount information of the color related to exchange in the consumable remaining amount recording portion 118 of the second unit control section 96. On the contrary, the consumable remaining amount recording portion 118 of the second unit control section 96 rewrites the toner remaining amount information of the color related to exchange with the toner remaining amount information of the color related to exchange in the consumable remaining amount recording portion 112 of the first unit control section 94. In this case, identification information of the toner cartridge is also replaced.

For example, in a case where the remaining amount information for each date and time of the toner is recorded in each of the consumable remaining amount recording portions 112 and 118, all the dates and times and the remaining amount information until the toner cartridges are exchanged are exchanged. FIG. 6 shows a state of the remaining amount information of the toner recorded in the consumable remaining amount recording portions 112 and 118 before and after exchange of the black (K) toner cartridges. FIG. 6 shows a remaining amount of toner for each image forming unit, for each color of toner, and for each date and time. With the exchange of the black (K) toner cartridges, pieces of information regarding the remaining amount of the black (K) toners are exchanged in the first image forming unit 16 and the second image forming unit 18.

Information regarding a usage amount of the toner for each date and time may be recorded in each of the consumable remaining amount recording portions 112 and 118. In this case, pieces of the information regarding the usage amount for each of all dates and times until the toner cartridges are exchanged are exchanged. In addition to this, the consumable exchange determination portion 106 may replace the information regarding a usage amount of the color related to exchange for each image forming unit for each printing instruction stored in the consumable usage amount storage portion 108.

In a case where the consumable exchange determination portion 106 exchanges the management information of the toner cartridge that is an exchange target in the first image forming unit 16 and the management information of the toner cartridge that is an exchange target in the second image forming unit 18, the process proceeds to a printing process in step S411 that will be described later.

Figure 7:
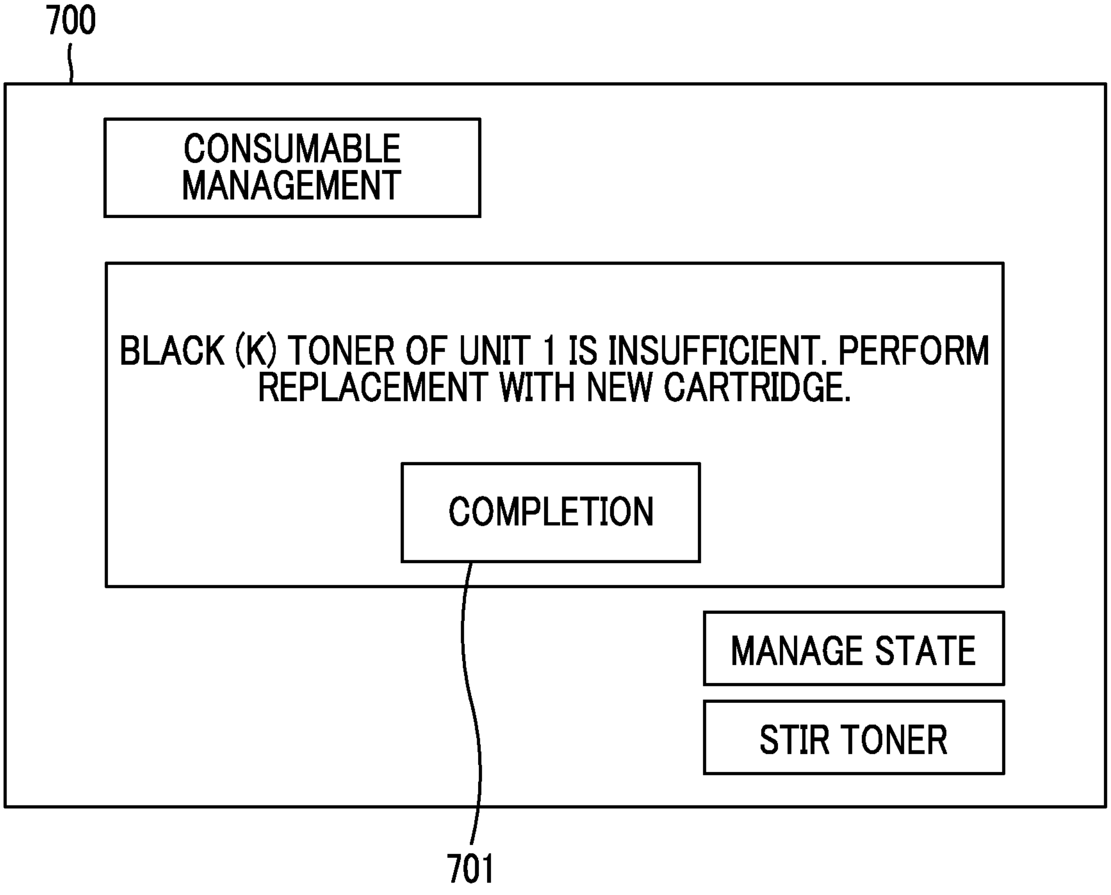
FIG. 7 is a diagram showing an example of a toner exchange instruction screen.
Figure 8:
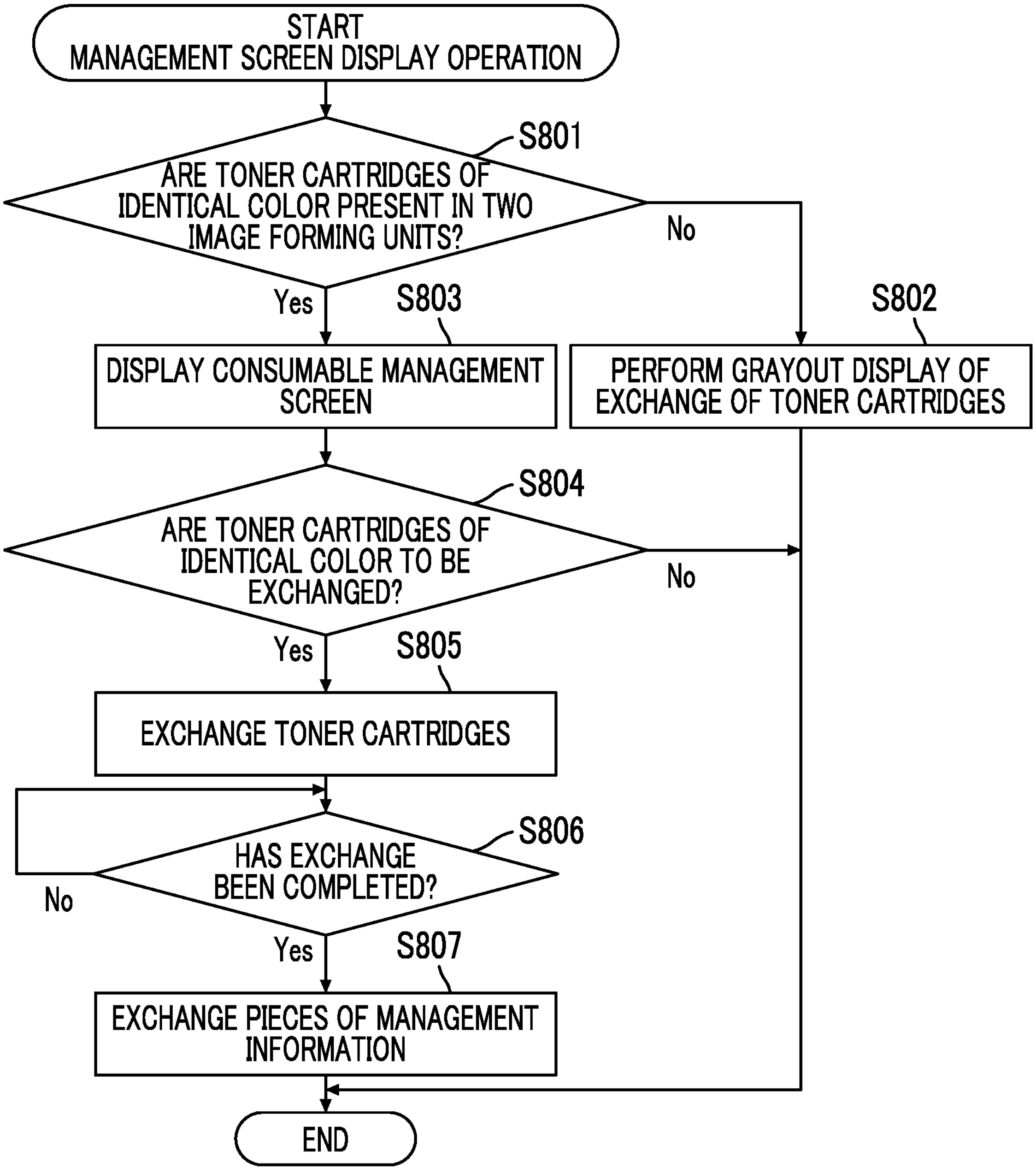
FIG. 8 is a flowchart showing a process in a case where toner cartridges of an identical color are exchanged except when a printing instruction is executed.

In step S404, in a case where a toner cartridge of an identical color to the unusable toner cartridge is not present in the image forming unit that does not perform image formation, the following process in step S409 is performed. Even in a case where the user selects not to exchange the toner cartridges in step S405, the following process in step S409 is performed. In step S409, the consumable exchange determination portion 106 displays a toner exchange instruction screen 700 as shown in FIG. 7 on the operation panel 78.

The user exchanges the toner cartridges that are exchange targets and presses the "completion" button 701. In step S410, the consumable information management portions 110 and 116 of the image forming units in which the toner cartridges have been exchanged detect the exchange with the new toner by detecting the CRUM of the new toner cartridge. The consumable information management portions 110 and 116 in which the toner cartridges have been exchanged rewrite the pieces of information in the consumable remaining amount recording portions 112 and 118, and proceed to the printing process in step S411.

In step S411, the printability determination portion 104 transmits the raster image stored in the first memory 82 to the unit control section of the image forming unit designated to perform the image formation, and instructs the unit control section to perform the image formation. The printing control portion 114 of the first unit control section 94 or the printing control portion 120 of the second unit control section 96 performs image formation in response to an instruction from the printability determination portion 104. At the time of at least one of image formation in the first image forming unit 16 or image formation in the second image forming unit 18, the printing control portion 114 also controls an operation of each part of the paper feeding device 12, the transport device 14, the fixing device 20, and the discharge device 22, and ends the process.

Figure 9A:
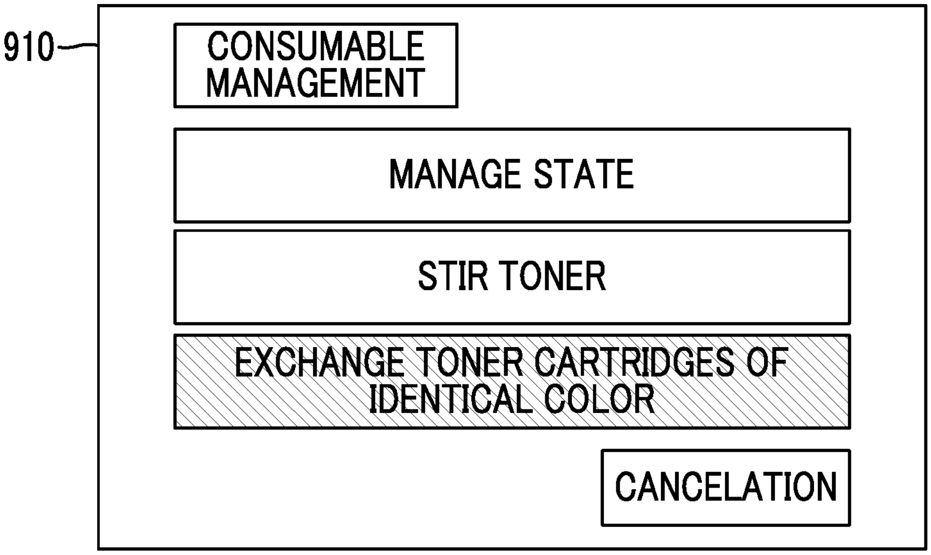
FIG. 9A is a diagram showing an example of a consumable management screen in a case where toner cartridges of an identical color cannot be exchanged.
Figure 9B:
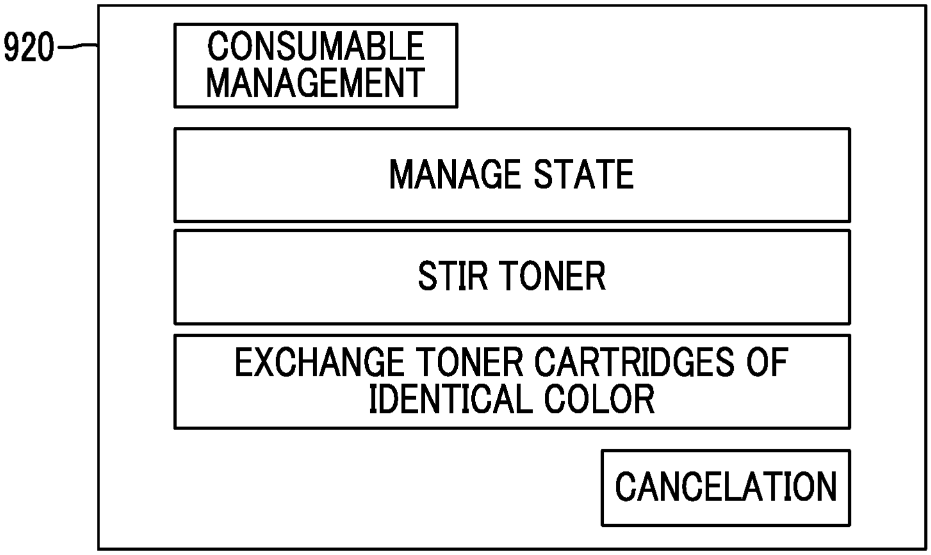
FIG. 9B is a diagram in a case where the toner cartridges of an identical color can be exchanged.

Next, with reference to FIGS. 8 and 9A to 9C, a process in a case where toner cartridges of an identical color are exchanged in a case where printing is not being executed will be described. First, the user operates the operation panel 78 to display a consumable management screen 910 as shown in FIG. 9B. In this case, in step S801 in FIG. 8, the consumable exchange determination portion 106 determines whether or not toner cartridges of an identical color are present in the first image forming unit 16 and the second image forming unit 18. In a case where the toner cartridges of an identical color are not present, the consumable exchange determination portion 106 determines that the toner cartridges of an identical color cannot be exchanged between the image forming units. In step S802, as shown in FIG. 9A, grayout display is performed such that the user cannot select the exchange of toner cartridges of an identical color, and the process is ended. Alternatively, pop-out display indicating that the toner cartridges of an identical color cannot be exchanged may be performed.

In a case where toner cartridges of an identical color are present, in step S801, the consumable exchange determination portion 106 determines that the toner cartridges of an identical color can be exchanged between the image forming units, and proceeds to step S803.

In step S803, the consumable exchange determination portion 106 displays a consumable management screen 920 as shown in FIG. 9B on the operation panel 78.

In step S804, the consumable exchange determination portion 106 determines whether or not the user has selected "exchange of toner cartridges of an identical color" on the consumable management screen 920. In a case where the user selects a "cancelation" button, the process is ended. In a case where the user has selected "exchange of toner cartridges of an identical color", the process proceeds to step S805.

Figure 9C:
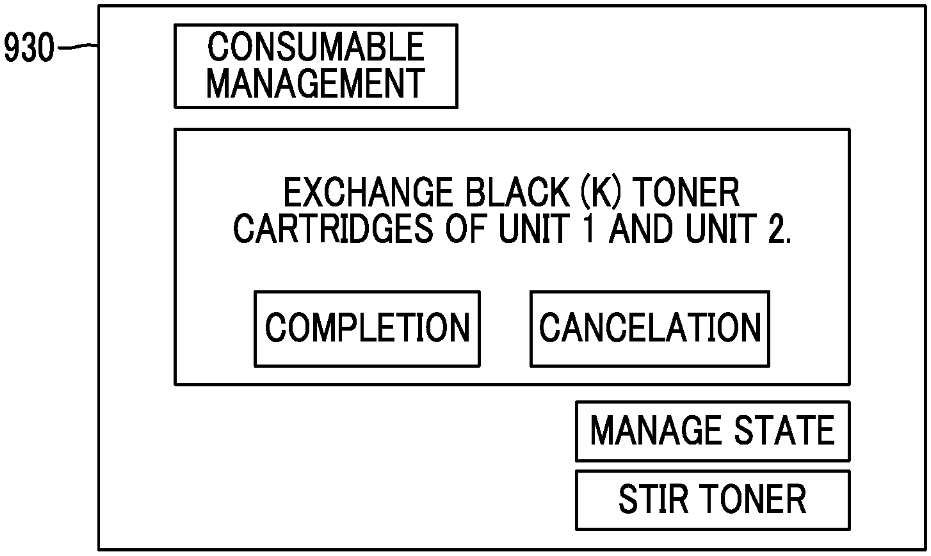
FIG. 9C is a diagram showing an example of a message screen for prompting to exchange the toner cartridges of an identical color.

In step S805, the consumable exchange determination portion 106 displays a message screen 930 for prompting exchange of toner cartridges of an identical color as shown in FIG. 9C on the operation panel 78. In this case, in a case where there are a plurality of combinations of exchangeable toner cartridges of colors, the user may be made to select a color of the exchangeable toner cartridges. The user exchanges the toner cartridges of an identical color according to a message displayed on the operation panel 78.

In a case where the exchange is ended, the user selects a "completion" button on the message screen 930. In step S806, the consumable exchange determination portion 106 considers that the exchange of the toner cartridges of the color related to exchange has been completed, and proceeds to the subsequent process in step S807.

In step S807, the consumable exchange determination portion 106 exchanges the management information of the toner cartridge of the first image forming unit 16 and the management information of the toner cartridge of the second image forming unit 18 of the color related to the exchange, and ends the process.

Specifically, the consumable information management portion 110 of the first unit control section 94 and the consumable information management portion 116 of the second unit control section 96 are instructed to exchange the toner remaining amount information of the first image forming unit 16 and the toner remaining amount information of the second image forming unit 18 of the color related to exchange. In response to this instruction, the consumable remaining amount recording portion 112 of the first unit control section 94 rewrites the toner remaining amount information of the color related to exchange with the toner remaining amount information of the color related to exchange in the consumable remaining amount recording portion 118 of the second unit control section 96. On the contrary, the consumable remaining amount recording portion 118 of the second unit control section 96 rewrites the toner remaining amount information of the color related to exchange with the toner remaining amount information of the color related to exchange in the consumable remaining amount recording portion 112 of the first unit control section 94.

For example, as described with reference to FIG. 6, in a case where the remaining amount information of the toner for each date and time is recorded in the consumable remaining amount recording portions 112 and 118, all the dates and times and the remaining amount information until the toner cartridges are exchanged are exchanged. Since the exchange of the remaining amount information in this case has been described with reference to FIG. 6, the description thereof will be omitted. Alternatively, in a case where information regarding a usage amount of the toner for each date and time is recorded in the consumable remaining amount recording portions 112 and 118, pieces of the information regarding the usage amount for each of all dates and times until the toner cartridges are exchanged are exchanged.

Information regarding a usage amount of the toner for each date and time may be recorded in each of the consumable remaining amount recording portions 112 and 118. In this case, pieces of the information regarding the usage amount for each of all dates and times until the toner cartridges are exchanged are exchanged. In addition to this, the consumable exchange determination portion 106 may replace the information regarding a usage amount of the color related to exchange for each image forming unit for each printing instruction stored in the consumable usage amount storage portion 108.

In the above example, the case where the user exchanges the toner cartridges in accordance with a message on the consumable management screen displayed on the operation panel 78 has been described, but an exchange timing is not limited to the above example. For example, the toner cartridges may be exchanged before the user operates the operation panel 78, and then the user operates the operation panel 78 to cause the image forming apparatus 10 to ascertain that the toner cartridges have been exchanged, and the pieces of management information may be exchanged.

Figure 10:
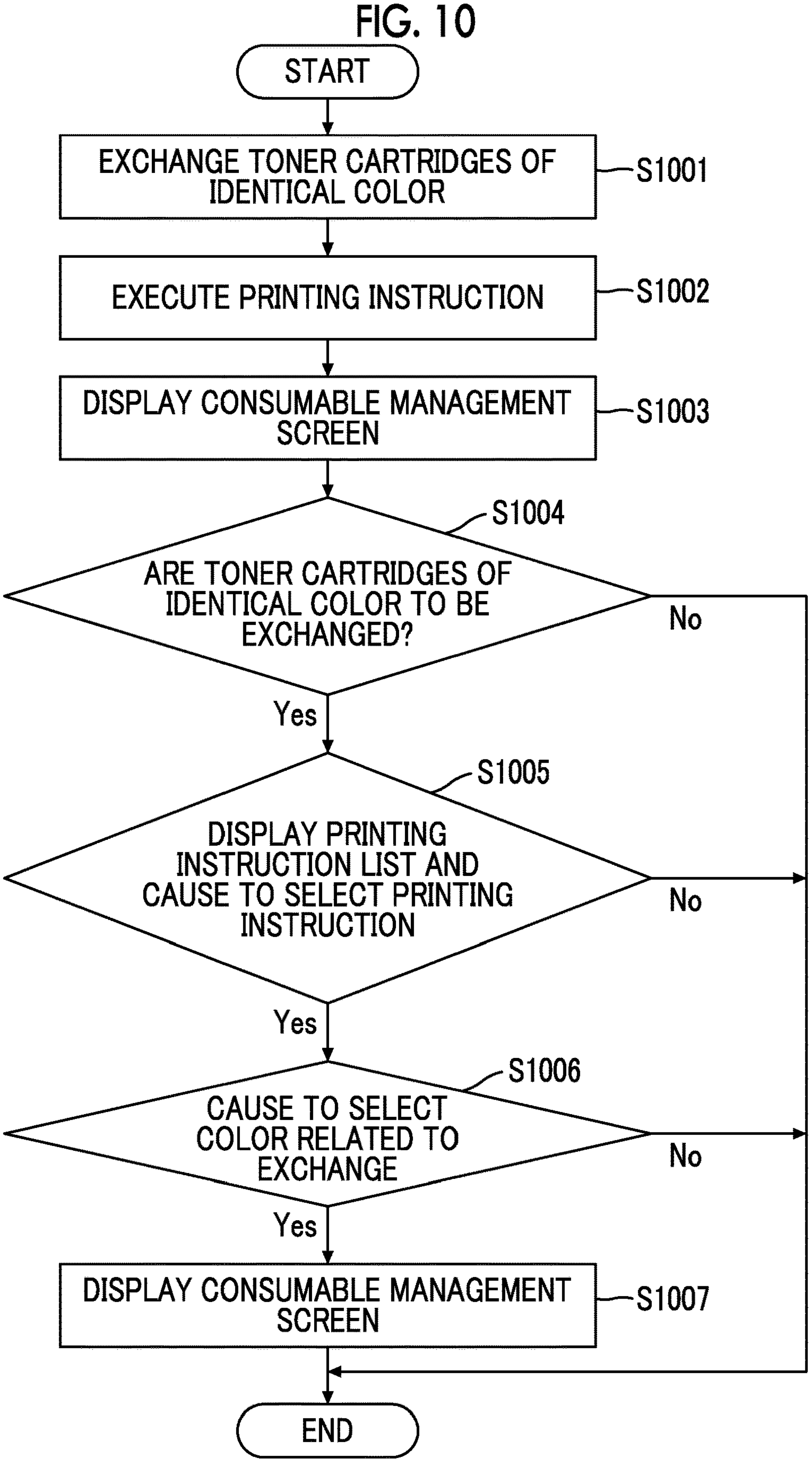
FIG. 10 is a flowchart showing a process in a case where printing is not being executed, and a user receives a message indicating that the toner cartridges have been exchanged after the toner cartridges were exchanged.

Next, with reference to FIGS. 10 to 12, a process in a case where printing is not being executed and information indicating that toner cartridges have been exchanged is received from a user after the toner cartridges were exchanged will be described. In the following example shown in FIGS. 10 to 12, the user further executes a printing instruction after toner cartridges are replaced, and then the user operates the operation panel 78 to cause the image forming apparatus 10 to ascertain that the toner cartridges have been exchanged.

In step S1001, the user exchanges the toner cartridges of an identical color. In this exchange, in a case where the CRUM is not attached to the toner cartridges, the exchange is not detected on the image forming apparatus 10 side.

In step S1002, the image forming apparatus 10 executes a printing instruction. Although detailed description of printing will be omitted, the consumable usage amount storage portion 108 stores an amount of toner consumed for each printing instruction for each image forming unit and for each color of the toner cartridge.

Figure 11A:
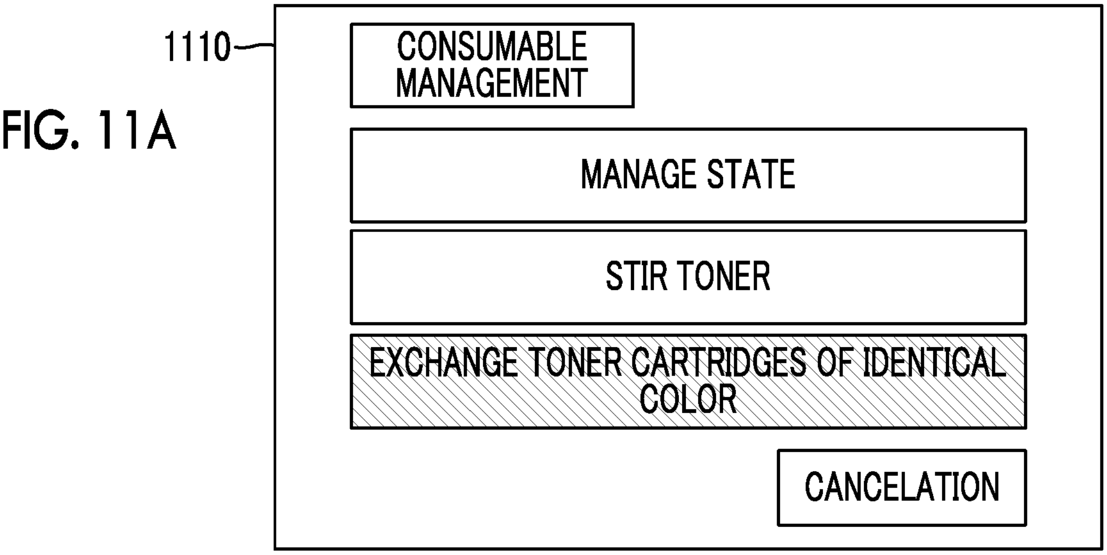
FIG. 11A is a diagram showing an example of a consumable management screen.

In step S1003, the user operates the operation panel 78 to display a consumable management screen 1100 as shown in FIG. 11A.

In step S1004, the consumable exchange determination portion 106 determines whether or not the user has selected exchange of the toner cartridges of an identical color on the consumable management screen 1110. In a case where the user selects a cancelation button, the process is ended. In a case where the user has selected exchange of toner cartridges of an identical color, the process proceeds to step S1005.

Figure 11B:
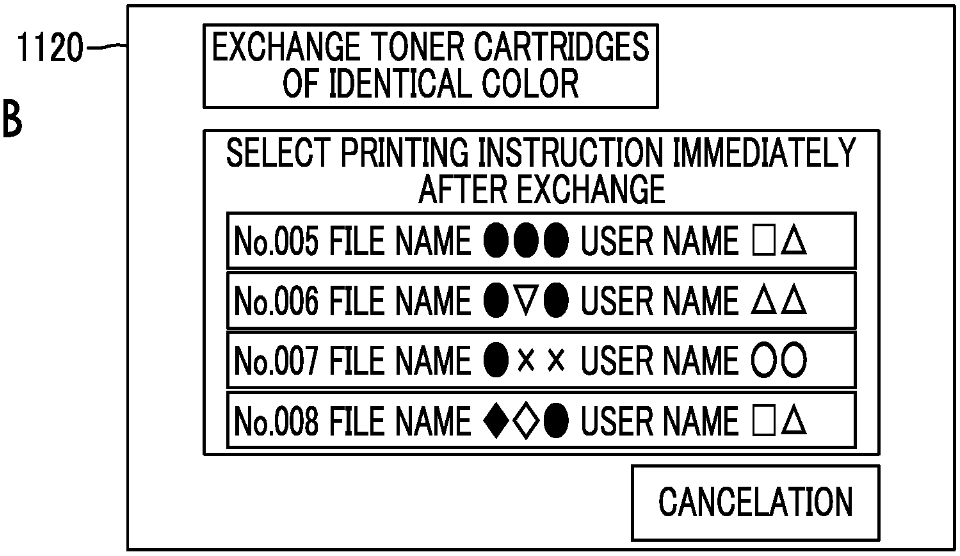
FIG. 11B is a diagram showing an example of a printing instruction selection screen.

In step S1005, the consumable exchange determination portion 106 acquires history information of printing instructions stored in the consumable usage amount storage portion 108, and displays a printing instruction selection screen 1120 as shown in FIG. 11B, and causes the user to select a printing instruction from the history information of printing instructions immediately after the exchange of the toner cartridge. A printing instruction list is displayed on the printing instruction selection screen 1120, and the user is requested to select a printing instruction immediately after the toner cartridges are exchanged from the list. In a case where the user selects a cancelation button, the process is ended. In a case where the user selects a printing instruction immediately after the toner cartridges are exchanged, the process proceeds to step S1006.

Figure 11C:
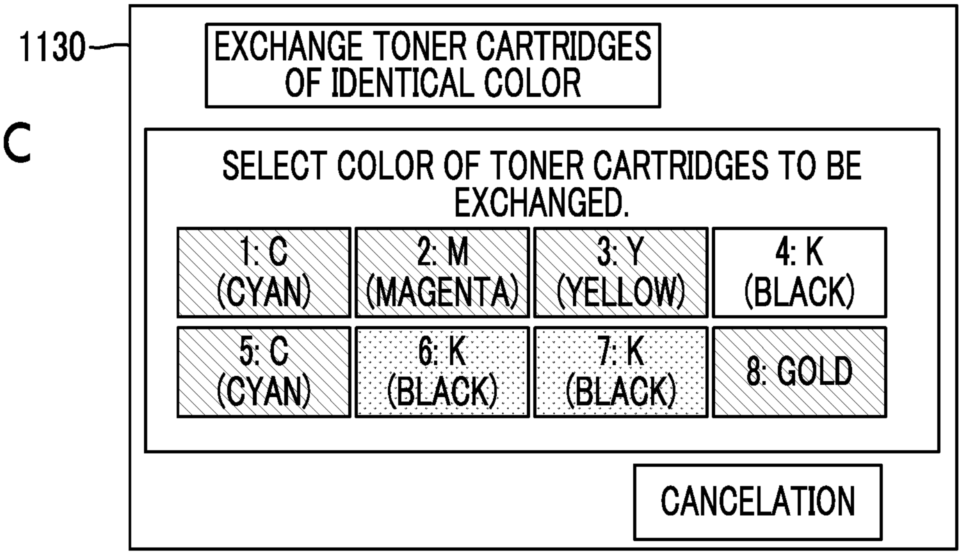
FIG. 11C is a diagram showing an example of a color selection screen for toner cartridges to be exchanged.

In step S1006, in a case where there are a plurality of combinations of exchangeable toner cartridges of colors, a selection screen 1130 as shown in FIG. 11C is displayed, and the user is made to select a color of exchangeable toner cartridges. In a selection screen 1130, as shown in FIG. 11C, colors that cannot be exchanged may be grayed out such that the colors cannot be selected, and only colors that can be exchanged may be displayed such that the colors can be selected. For example, FIG. 11C shows a case where three exchangeable toner cartridges of black (K) are set. Specifically, it is shown that the toner cartridge of "4: black (K)" is insufficient, and two cartridges of "6: black (K)" and "7: black (K)" are replaceable with the toner cartridge of "4: black (K)". In a case where the user selects a cancelation button, the process is ended.

In step S1007, the consumable exchange determination portion 106 refers to a toner usage amount of a color related to exchange for each printing instruction stored in the consumable usage amount storage portion 108, and traces back to the history information received from the present time and corrects the management information. Pieces of the management information of the two toner cartridges that have been exchanged are corrected and exchanged.

Specifically, the consumable exchange determination portion 106 calculates a usage amount of toner of a color related to exchange used during a period from the present time to the selected printing instruction, stored in the consumable usage amount storage portion 108. As shown in FIG. 12, pieces of the toner remaining amount information of the color related to exchange before the date and time corresponding to the selected printing instruction are exchanged between the consumable remaining amount recording portion 112 of the first unit control section 94 and the consumable remaining amount recording portion 118 of the second unit control section 96. The toner remaining amount information of the color related to exchange after the date and time corresponding to the selected printing instruction is rewritten with information calculated from the calculated toner usage amount, and the process is ended.

For example, in FIG. 11B, it is assumed that "No. 006" is designated as a printing instruction after the toner cartridges are exchanged, and the black (K) toner cartridges are exchanged. As shown in FIG. 12, pieces of the toner remaining amount information before the date and time "XX/10/16 12:00" corresponding to the printing instruction of "No. 006" are exchanged between the first image forming unit 16 and the second image forming unit 18. A toner remaining amount after the date and time is calculated from information regarding a toner usage amount for each printing instruction and rewritten.

For example, after the black (K) toner cartridges are exchanged, only "7" of the black (K) toner is used in the first image forming unit 16. Therefore, a remaining amount of the black (K) toner in the first image forming unit 16 at the present time is "86" obtained by subtracting "7" from "93" after the exchange. After the black (K) toner cartridges are exchanged, the black (K) toner is not used in the second image forming unit 18. Therefore, a remaining amount of the black (K) toner in the second image forming unit 18 at the present time remains "10" after the exchange.

In the above example, the case where the user selects the printing instruction immediately after the exchange of the toner cartridges from the history information of printing instructions has been described, but a printing instruction immediately before the exchange may be selected. Alternatively, the user may input or select date-and-time information on which the toner cartridges were exchanged, correct the management information by tracing back to a time point at which the toner cartridges were exchanged by using the received date-and-time information and history information of printing processes executed in the past, and exchange pieces of the management information.

In the above exemplary embodiment, the case where the image forming apparatus 10 has two image forming units has been described, but three or more image forming units may be provided. The image forming apparatus 10 may include three or more image forming units in which toner cartridges of an identical color are set, and toner cartridges of an identical color may be exchanged among the toner cartridges. In that case, the user needs to operate the operation panel 78 to indicate which image forming unit toner cartridges have been exchanged.

In the above exemplary embodiment, the case where a consumable is toner and a consumable unit is a toner cartridge has been described as an example. However, a consumable may be other than the toner and a consumable unit may be other than the toner cartridge. For example, even in a case where a consumable is a drum unit, the principle of the present disclosure can be applied.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Supplementary Note (((1)))

An image forming apparatus comprising:

a plurality of image forming units including a plurality of image forming sections and an intermediate transfer body to which a toner image formed on the plurality of image forming sections is primarily transferred; and a processor, wherein the processor is configured to:

in a case where, during image formation using any of the image forming units among the image forming units, in a case where a consumable of any of the image forming sections of the image forming unit is insufficient, an image forming section of an identical color to the image forming section of which the consumable is insufficient is present in another image forming unit, and a storage medium for storing management information for managing a consumable unit is not provided in the consumable unit attached to the image forming section of which the consumable is insufficient, ask a user whether or not to exchange the consumable unit attached to the image forming section of which the consumable is insufficient and a consumable unit set in the image forming section of the other image forming unit; and in a case where information indicating a selection to exchange the consumable units has been received from the user, exchange pieces of management information of the two exchanged consumable units.

(((2)))

The image forming apparatus according to (((1))), wherein the consumable is toner, and the consumable unit is a toner cartridge, and the processor is configured to:

exchange pieces of identification information of toner cartridges and pieces of information regarding a toner remaining amount in management information of two exchanged toner cartridges.

(((3)))

The image forming apparatus according to (((2))), wherein the processor is configured to:

only in a case where a storage medium for storing management information is not provided in a toner cartridge that is an exchange target, ask the user whether or not to exchange a toner cartridge of which toner is insufficient and a toner cartridge set an image forming section of another image forming unit.

(((4)))

The image forming apparatus according to (((1))), wherein the processor is configured to:

in a case where printing is not being executed, and the user selects to exchange a consumable unit of an image forming section of a certain image forming unit and a consumable unit of an image forming section of another image forming unit, exchange pieces of management information of the two exchanged consumable units.

(((5)))

The image forming apparatus according to (((1))), wherein the processor is configured to:

in a case where information indicating that the consumable units have been exchanged is received from the user after the consumable units have been exchanged, correct the management information by tracing back to a past time point at which the consumable units are exchanged and then exchange pieces of the management information of the two exchanged consumable units.

(((6)))

The image forming apparatus according to (((5))), wherein the processor is configured to:

receive, from the user, a selection of history information after the consumable units are exchanged from history information of printing processes executed in the past, correct the management information by tracing back to the received history information, and then exchange the pieces of management information of the two exchanged consumable units.

(((7)))

The image forming apparatus according to (((5))), wherein the processor is configured to:

receive, from the user, date-and-time information at which the consumable units were exchanged, correct the management information by tracing back to a time point at which the consumable units are exchanged by using the received date-and-time information and history information of printing processes executed in the past, and then exchange the pieces of management information of the two exchanged consumable units.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a plurality of image forming units including a plurality of image forming sections and an intermediate transfer body to which a toner image formed on the plurality of image forming sections is primarily transferred; and a processor, wherein the processor is configured to:

in a case where, during image formation using any of the image forming units among the image forming units, in a case where a consumable of any of the image forming sections of the image forming unit is insufficient, an image forming section of an identical color to the image forming section of which the consumable is insufficient is present in another image forming unit, and a storage medium for storing management information for managing a consumable unit is not provided in the consumable unit attached to the image forming section of which the consumable is insufficient, ask a user whether or not to exchange the consumable unit attached to the image forming section of which the consumable is insufficient and a consumable unit set in the image forming section of the other image forming unit; and in a case where information indicating a selection to exchange the consumable units has been received from the user, exchange pieces of management information of the two exchanged consumable units.

2. The image forming apparatus according to claim 1, wherein the consumable is toner, and the consumable unit is a toner cartridge, and the processor is configured to:

exchange pieces of identification information of toner cartridges and pieces of information regarding a toner remaining amount in management information of two exchanged toner cartridges.

3. The image forming apparatus according to claim 2, wherein the processor is configured to:

only in a case where a storage medium for storing management information is not provided in a toner cartridge that is an exchange target, ask the user whether or not to exchange a toner cartridge of which toner is insufficient and a toner cartridge set an image forming section of another image forming unit.

4. The image forming apparatus according to claim 1, wherein the processor is configured to:

in a case where printing is not being executed, and the user selects to exchange a consumable unit of an image forming section of a certain image forming unit and a consumable unit of an image forming section of another image forming unit, exchange pieces of management information of the two exchanged consumable units.

5. The image forming apparatus according to claim 1, wherein the processor is configured to:

in a case where information indicating that the consumable units have been exchanged is received from the user after the consumable units have been exchanged, correct the management information by tracing back to a past time point at which the consumable units are exchanged and then exchange pieces of the management information of the two exchanged consumable units.

6. The image forming apparatus according to claim 5, wherein the processor is configured to:

receive, from the user, a selection of history information after the consumable units are exchanged from history information of printing processes executed in the past, correct the management information by tracing back to the received history information, and then exchange the pieces of management information of the two exchanged consumable units.

7. The image forming apparatus according to claim 5, wherein the processor is configured to:

receive, from the user, date-and-time information at which the consumable units were exchanged, correct the management information by tracing back to a time point at which the consumable units are exchanged by using the received date-and-time information and history information of printing processes executed in the past, and then exchange the pieces of management information of the two exchanged consumable units.

8. A non-transitory computer readable medium storing an image forming program causing a computer to execute a process, the process comprising:

asking, in a case where, during image formation using any of a plurality of image forming units, in a case where a consumable of any of image forming sections of the image forming unit is insufficient, an image forming section of an identical color to the image forming section of which the consumable is insufficient is present in another image forming unit, and a storage medium for storing management information for managing a consumable unit is not provided in the consumable unit attached to the image forming section of which the consumable is insufficient, a user whether or not to exchange the consumable unit attached to the image forming section of which the consumable is insufficient and a consumable unit set in the image forming section of the other image forming unit; and exchanging, in a case where information indicating a selection to exchange the consumable units has been received from the user, pieces of management information of the two exchanged consumable units.

* * * * *